United States Patent
Laugros

(10) Patent No.: US 12,321,856 B2
(45) Date of Patent: Jun. 3, 2025

(54) METHOD, COMPUTER PROGRAM AND DEVICE FOR EVALUATING THE ROBUSTNESS OF A NEURAL NETWORK AGAINST IMAGE DISTURBANCES

(71) Applicant: BULL SAS, Les Clayes-sous-bois (FR)

(72) Inventor: Alfred Laugros, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 997 days.

(21) Appl. No.: 17/336,507

(22) Filed: Jun. 2, 2021

(65) Prior Publication Data

US 2021/0374482 A1 Dec. 2, 2021

(30) Foreign Application Priority Data

Jun. 2, 2020 (EP) .................................... 20305577

(51) Int. Cl.
*G06N 3/08* (2023.01)
*G06F 18/21* (2023.01)
(Continued)

(52) U.S. Cl.
CPC .............. *G06N 3/08* (2013.01); *G06F 18/217* (2023.01); *G06F 18/22* (2023.01); *G06V 10/764* (2022.01)

(58) Field of Classification Search
CPC ........ G06N 3/08; G06N 3/045; G06F 18/217; G06F 18/22; G06F 18/2413; G06V 10/764

See application file for complete search history.

(56) References Cited

U.S. PATENT DOCUMENTS

2019/0362233 A1* 11/2019 Aizawa ................. G06V 10/764
2022/0358747 A1* 11/2022 Hüger .................... G06V 10/82

OTHER PUBLICATIONS

Laugros, Alfred, Alice Caplier, and Matthieu Ospici. "Are adversarial robustness and common perturbation robustness independent attributes?" Proceedings of the IEEE/CVF International Conference on Computer Vision Workshops. 2019.*

(Continued)

*Primary Examiner* — Vu Le
*Assistant Examiner* — Valenteana Shlommit Fung
(74) *Attorney, Agent, or Firm* — ARC IP Law, PC; Joseph J. Mayo

(57) ABSTRACT

The invention relates to a method (100) for evaluating the robustness of a neural network (102) used for image processing against a group of at least two different disturbances that can be found in images. The method comprises determining a robustness score ($SRI_i$), called individual robustness score, of said neural network (102) for each disturbance ($P_i$) in said group; determining at least one similarity score ($SSI_{i,j}$), called individual similarity score, for the similarity between two disturbances in said group; and calculating a robustness score (SRG), called overall robustness score, of said neural network (102) against said group of disturbances as a function of: the individual robustness scores ($SRI_i$) for all the disturbances (P), and at least one individual similarity score ($SSI_{i,j}$) for the similarity between two disturbances. The invention also relates to a computer program and a device implementing such a method.

17 Claims, 2 Drawing Sheets

(51) Int. Cl.
  *G06F 18/22*  (2023.01)
  *G06V 10/764*  (2022.01)

(56) References Cited

OTHER PUBLICATIONS

European Search Report issued in EP20305577.7 dated Dec. 4, 2020 (8 pages).
Laugros, et al., "Are Adversarial Robustness and Common Perturbation Robustness Independent Attributes?", ARXIV.Org, Cornell University Library, Sep. 4, 2019 (10 pages).

* cited by examiner

METHOD, COMPUTER PROGRAM AND DEVICE FOR EVALUATING THE ROBUSTNESS OF A NEURAL NETWORK AGAINST IMAGE DISTURBANCES

This application claims foreign priority to European Patent Application No. 20305577.7, filed 2 Jun. 2020, the specification of which is hereby incorporated herein by reference.

BACKGROUND OF THE INVENTION

Field of the Invention

The present invention relates to a method for evaluating the robustness of a neural network against disturbances in images. It also relates to a device and a computer program configured to implement such a method.

The field of the invention is the field of neural networks used for automated image processing.

Description of the Related Art

Today, neural networks are widely used in the field of automated image processing, mainly for automated classification of images, or for automated recognition of objects in images.

To this end, a neural network is first trained on a set of images, called training set, then its performance is tested on a set of images, called test set; wherein the latter may be partially or totally different from the training set.

It is useful to evaluate the robustness of a neural network against a disturbance present in an image. This robustness is evaluated by comparing the performance score obtained with the neural network for images not containing the disturbance with the performance score obtained with this same neural network for these same images with said disturbance inserted therein.

The overall robustness of a neural network against different disturbances is evaluated by taking into account the robustness of this neural network against each type of disturbance individually. This solution does not make it possible to obtain an accurate evaluation of the overall robustness of a neural network against a group of several disturbances.

An aim of the present invention is to overcome this drawback.

Another aim of the present invention is to propose a method making it possible to evaluate the overall robustness of a neural network against a group of several disturbances more accurately.

BRIEF SUMMARY OF THE INVENTION

The invention makes it possible to achieve at least one of these aims with a method for evaluating the robustness of a neural network used for image processing against a group of at least two different disturbances that can be found in images, said method comprising the following steps:
- determining a robustness score, called individual robustness score, of said neural network for each disturbance in said group;
- determining at least one similarity score, called individual similarity score, for the similarity between two disturbances in said group; and
- calculating a robustness score, called overall robustness score, of said neural network against said group of disturbances on as a function of:
  - the individual robustness scores for all the disturbances, and
  - at least one individual similarity score for the similarity between two disturbances.

Thus, the method according to the invention proposes taking into account the similarities between the disturbances when drawing up the overall robustness score. As a result, the method according to the invention makes it possible to determine the overall robustness score of a neural network more accurately, compared with the current solutions, which do not take into account the similarities between the disturbances. On the contrary, the current solutions attach equal importance to all the disturbances when aggregating the individual robustness scores in order to draw up the overall robustness score. When two disturbances are very similar, for example an image rotation or a shearing of the image, the estimation of the overall robustness will give too much weight to these two disturbances in relation to the other disturbances, which the present invention makes it possible to avoid.

In the present document, by "image" is meant a digital image or a numerical image, in particular numerical data representing an image.

In the present document, by "disturbance" in an image is meant any modification, or degradation, of an image. In an non-limitative manner, a disturbance of an image can comprise a modification, in a part or all of said image, of the shape of the image, of the orientation of the image, of a colour in the image, of an item of information contained in the image by deletion or by addition of garbage information, etc.

In a preferred version, the method according to the invention can comprise, for each disturbance in the group of disturbances, determining an individual similarity score for the similarity between said disturbance and each of the other disturbances in said group. In this case, the calculation of the overall robustness score can be carried out on the basis of all the individual similarity scores obtained in this way.

In other words, when the group of disturbances comprises N disturbances, or N types of disturbance, then the determination step can comprise determining M similarity scores, where $$M = N*(N-1)/2.$$

This preferred version of the method according to the invention makes it possible to determine a more accurate overall robustness score, by taking into account all the similarities between all the disturbances in the group of disturbances, taken in twos.

According to an entirely non-limitative embodiment, determining an individual similarity score for the similarity between a first disturbance and a second disturbance may comprise the following steps, carried out with a set of images:
- constructing a first version of said set of images, in which each image contains said first disturbance, and a second version of said set of images, in which each image contains said second disturbance;
- obtaining a first instance of the neural network trained with said first version of said set of images and a second instance of said neural network trained with said second version of said set of images;
- determining a first relative robustness score, by testing said first instance of the neural network on said second version of said set of images, and a second relative robustness score, by testing said second instance of the neural network with said first version of the set of images; and calculating the individual similarity score on the basis of said first and second relative robustness scores.

This embodiment makes it possible to determine a similarity score for the similarity between two disturbances by taking into account the specific features of the neural network. In other words, the similarity between two disturbances is determined on the basis of the neural network in question, which is more accurate.

According to an embodiment, the individual similarity score can correspond to an average of the first and second relative robustness scores.

According to an alternative embodiment, the similarity between two disturbances can be determined independently of the neural network.

For example, the similarity between a first disturbance and a second disturbance can be determined by calculating a correlation between two versions of one and the same image, one of the versions containing only the first disturbance and the other of the versions containing only the second disturbance.

In this alternative embodiment, several correlation values can be calculated by taking several images into account. The similarity score for the similarity between the two disturbances can be calculated as a function, and in particular as being an average, of all the correlation values obtained for all the images.

Of course, other techniques for estimating, or calculating, similarity can be used to estimate the similarity between two disturbances.

For one disturbance, determining an individual robustness score can comprise the following steps:

training the neural network with a set of images, called training set;

constructing a modified version of said set of images, in which each image contains said disturbance;

determining said individual robustness score by testing said trained neural network on said modified version of said set of images.

Thus, the robustness score of the neural network can be determined individually for each disturbance.

Preferably, one and the same training set can be used for all the disturbances. In this case, as many versions of said training set are constructed as there are disturbances.

According to an embodiment, the step of calculating the overall robustness score can comprise, for at least one, in particular each, disturbance, weighting the individual robustness score obtained for said disturbance with the similarity score for the similarity of said disturbance to at least one, in particular each, of the other disturbances.

In this case, it is the weighted individual robustness score that is used in the calculation of the overall robustness score of the neural network.

In particular, for at least one, in particular each, disturbance, an overall similarity score, denoted $SSG_i$, can be determined, on the basis of the individual similarity scores for the similarity of this disturbance to each of the other disturbances. This overall similarity score can then be used to weight the individual robustness score obtained for said disturbance upwards or downwards.

For a disturbance, the overall similarity score can be calculated according to any mathematical relationship taking into account all the individual similarity scores obtained for this disturbance. According to a particular embodiment example, the overall similarity score $SSG_i$ for a disturbance $P_i$ can be an average of the individual similarity scores obtained for the similarity between this disturbance and each of the other disturbances, according to the following relationship:

$$SSG_i = \frac{\sum_{j=1, j\neq i}^{N} SSI_{i,j}}{N-1}$$

where $SSI_{i,j}$ is the individual similarity score obtained for the similarity between the disturbance $P_i$ and the disturbance $P_j$.

The weighting of the individual robustness score with the individual similarity score(s), respectively with the overall similarity score, can be carried out according to any mathematical relationship taking these scores into account. According to a particular embodiment example, the weighting can consist of multiplying said individual robustness score by said individual similarity score(s), respectively by said overall similarity score, according to the following relationship:

$$SRIP_i = SRI_i * SSG_i$$

where $SRIP_i$ is the weighted individual robustness score for the disturbance $P_i$.

According to a non-limitative embodiment, the overall robustness score can be calculated as being the average of the weighted individual robustness scores.

According to a non-limitative embodiment example, for a group comprising N disturbances, $P_1$-$P_N$, the overall robustness score, denoted SRG, of the neural network can be calculated using the following formula:

$$SRG = \frac{\sum_{i=1}^{N} SRIP_i}{N}$$

where $SRIP_i$ is the weighted individual robustness score for the disturbance $P_i$.

According to an entirely non-limitative embodiment example, at least one image disturbance can be chosen from the following disturbances:

distortion of at least one colour in an image;
rotation of an image;
shearing of an image;
blurring of an image;
noise in an image.

Of course, this list is in no way limitative.

The neural network the robustness of which is being evaluated can be any type of neural network that can be used for image processing.

In particular, the neural network can be a "feed forward" neural network, for example with a single-layer perceptron or a multi-layer perceptron, a recurrent neural network, a resonance neural network, etc.

According to another aspect of the present invention, a computer program is proposed comprising instructions which, when they are executed by an electronic and/or computing device, implement the method according to the invention.

The computer program can be coded with any type of computer language, such as for example C, C++, JAVA, Python, etc.

The computer program can be stored in a computing or electronic device.

Alternatively, the computer program can be stored on a medium that can be read by a computing or electronic device, such as a memory card or a USB flash drive for example. In this case, the invention also relates to the medium storing said computer program. According to another aspect of the present invention, a device for evaluating the robustness of a neural network used for image processing against a group of at least two different disturbances that can be found in images is proposed, said device comprising:
- a module for determining a robustness score, called individual robustness score, of said neural network for each disturbance in said group;
- a module for determining at least one similarity score for the similarity between two disturbances in said group; and
- a module for calculating a robustness score, called overall robustness score, of said neural network against said group of disturbances;
- configured to implement all the steps of the method according to the invention.

At least one of these modules can be a computer program.

At least one of these modules can be at least one digital component, such as a chip, a processor, a calculator, or at least one analogue component, or a combination of at least one digital component and at least one analogue component.

At least one of these modules can be separated from the other modules.

At least two of these modules can be combined or integrated within one and the same module.

BRIEF DESCRIPTION OF THE DRAWINGS

Other advantages and characteristics will become apparent on examination of the detailed description of an entirely non-limitative embodiment, and from the attached drawings, in which.

DETAILED DESCRIPTION OF THE INVENTION

It is well understood that the embodiments that will be described hereinafter are in no way limitative. Variants of the invention can in particular be envisaged comprising only a selection of characteristics described hereinafter in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In the figures, the elements common to several figures retain the same reference.

Figure 1:
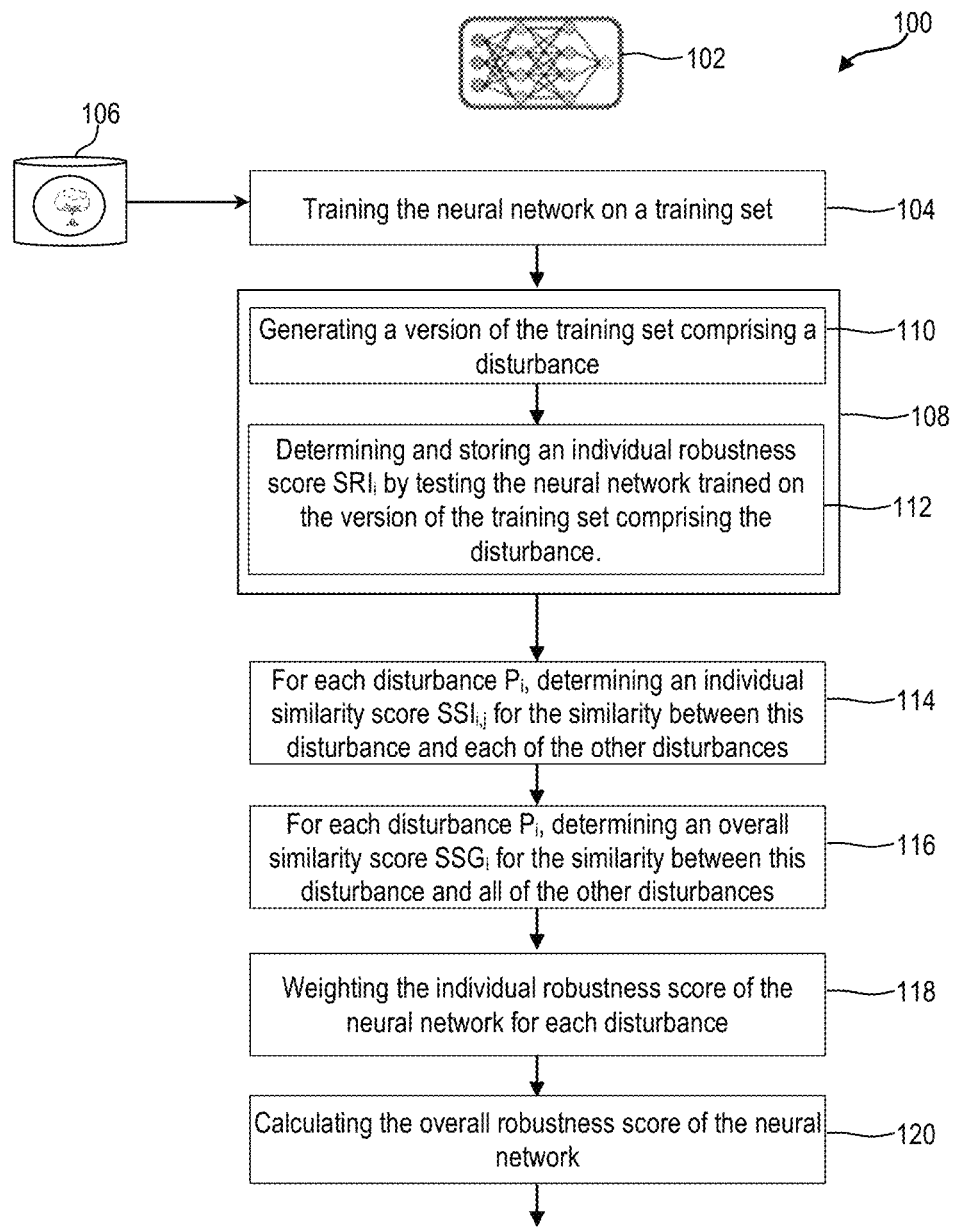
FIG. 1 is a diagrammatic representation of a non-limitative embodiment example of a method according to the invention.

FIG. 1 is a diagrammatic representation of a non-limitative embodiment example of a method according to the invention.

The method 100, shown in FIG. 1, can be used to determine the overall robustness score of a neural network 102 against a group of N different disturbances, or N different types of disturbance, denoted $P_i$, where $1 \leq i \leq N$.

The method comprises a step 104 of training the neural network 102 on a set of images 106, called training set, not containing a disturbance. This step 104 provides a trained instance of the neural network 102, trained on the training set 106.

The method 100 comprises a step 108 for determining a robustness score of the neural network individually for each disturbance.

For each disturbance, step 108 comprises a step 110, during which the training set is duplicated and the disturbance is inserted into each image found in the copy of the training set. Thus, step 110 provides a version of the training set in which each image contains the disturbance.

During a step 112, the neural network 102 trained on the training set 106 is tested on the version of the training set obtained in step 110. This step 112 provides an individual robustness score of the neural network 102 in relation to this disturbance.

This step 108 is carried out for each disturbance individually, for example in turn, and provides an individual robustness score, denoted $SRI_i$, of the neural network for each disturbance $P_i$, individually and independently of the other disturbances.

The method 100 also comprises a step 114 executed individually for each disturbance $P_i$ and providing, for each disturbance $P_i$, an individual similarity score for the similarity between this disturbance and each of the other disturbances. For a group of N disturbances, this step 114 provides, for each disturbance "i", (N−1) similarity scores, denoted $SSI_{i,j}$. During a step 116, an overall similarity score, denoted $SSG_i$, is calculated for each disturbance $P_i$ on the basis of the calculated individual similarity scores for the similarity between this disturbance Pi and each of the other disturbances. For a disturbance $P_i$, the overall similarity score $SSG_i$ can for example be calculated as being the average of all the individual similarity scores $SSI_{i,j}$, where $1 \leq i \leq N$ and $1 \leq j \leq N$, and $i \neq j$:

$$SSG_i = \frac{\sum_{1}^{N} SSI_{i,j} \text{ and } i \neq j}{N-1}$$

Thus, step 116 provides as many overall similarity scores as there are disturbances.

The method 100 also comprises a step 118, during which, for each disturbance $P_i$, the individual robustness score $SRI_i$ of the neural network 102 for this disturbance $P_i$ is weighted with the overall similarity score $SSG_i$ obtained for this disturbance $P_i$. This step 118 provides a weighted individual robustness score, denoted $SRIP_i$, of the neural network 102 for each disturbance $P_i$.

This weighting can be carried out according to any mathematical relationship taking into account the individual robustness score $SRI_i$ and the overall similarity score $SRG_i$. According to an embodiment example, this weighting can consist of simply multiplying the two scores, according to the relationship:

$SRIP_i = SRI_i * SSG_i$

Then, during a step 120, the overall robustness score SRG of the neural network 102 is calculated for the group of disturbances on the basis of all the weighted individual robustness scores obtained in step 118.

This calculation can be carried out according to any mathematical relationship taking into account all the weighted individual robustness scores obtained in step 118.

According to a non-limitative embodiment example, the overall robustness score, denoted SRG, of the neural network 102 can be calculated using the following relationship:

$$SRG = \frac{\sum_{i=1}^{N} SRIP_i}{N}$$

where $SRIP_i$ is the weighted individual robustness score for the disturbance $P_i$.

Of course, the method according to the invention is not limited to the example which has just been described.

For example, the mathematical relationships used can be different from those indicated.

In addition, steps 118 and 120 can be combined in a single calculation step taking into account the individual robustness scores and the individual similarity scores without going through the calculation of the overall similarity scores.

During step 114, the similarity between a first disturbance and a second disturbance can be estimated according to any known technique.

According to an embodiment example, this similarity can be determined by calculating a correlation score for the correlation between two versions of a set of images, a first version comprising images containing only the first disturbance and a second version comprising these same images containing only the second disturbance.

However, such a solution has the drawback of not taking into account the specific features of the neural network in the estimation of the similarity between two disturbances.

Figure 2:
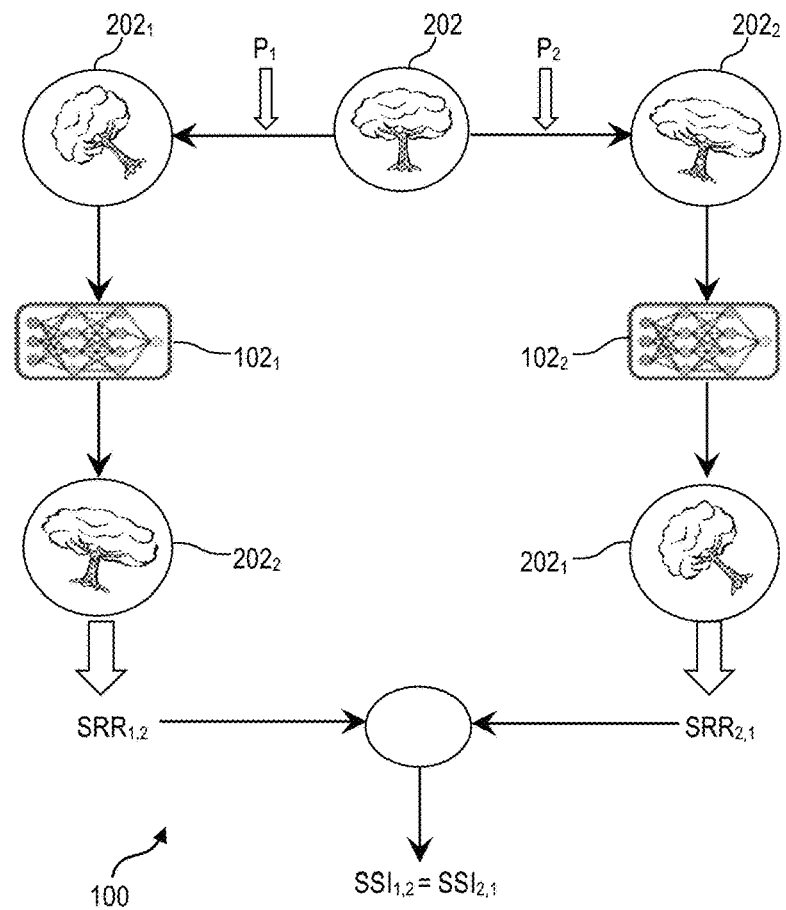
FIG. 2 is a diagrammatic representation of an embodiment example of a step of estimating the similarity between two disturbances.

FIG. 2 is a diagrammatic representation of a non-limitative embodiment example of a step of estimating the similarity between two disturbances.

Step 200, shown in FIG. 2, makes it possible to estimate the similarity between a first disturbance $P_1$ and a second disturbance $P_2$.

Step 200, shown in FIG. 2, can correspond to, or be used in, step 114 of the method 100 in FIGURE for estimating the similarity between all the disturbances considered in twos.

In the example in FIG. 2, it is supposed that the disturbance $P_1$ is an image rotation and the disturbance $P_2$ is a shear deformation of this same image.

Step 200 is carried out using a set of images 202, which can be for example the training set 106, or any other set of images.

Step 200 comprises generating a first version $202_1$ of the set 202 by generating a first copy of the set 202 and inserting the disturbance $P_1$ into each image in this copy, i.e. by applying a rotation to each image in this first copy of the set 202. Step 200 also comprises generating a second version $202_2$ of the set 202 by generating a second copy of the set 202 and inserting the disturbance $P_2$ into each image in this second copy, i.e. by applying a rotation to each image in this second copy of the set 202.

A first instance $102_1$ of the neural network 102 is trained on the first version $202_1$ of the set of images 202 and a second instance $102_2$ of the neural network 102 is trained on the second version $202_2$ of the set of images 202.

Then, the first instance $102_1$ of the neural network, trained on the first version $202_1$ of the set of images, is tested on the second version $202_2$ of the set of images, in order to obtain a first relative robustness score, denoted $SRR_{1,2}$. Similarly, the second instance $102_2$ of the neural network trained on the second version $202_2$ of the set of images is tested on the first version $202_1$ of the set of images, in order to obtain a second relative robustness score, denoted $SRR_{2,1}$.

On the basis of these two relative robustness scores obtained in this way, a similarity score $SSI_{1,2}$ is calculated for the similarity between the first disturbance $P_1$ and the second disturbance $P_2$. This calculation can be carried out according to any mathematical relationship taking into account these relative robustness scores. According to a non-limitative embodiment example, the individual similarity score, denoted $SSI_{1,2}$, for the similarity between the first disturbance P1 and the second disturbance P2, can be calculated as being the average of the relative robustness scores, according to the following relationship:

$$SSI_{1,2} = SSI_{2,1} = \frac{SRR_{1,2} + SRR_{2,1}}{2}$$

Of course, the example given in FIG. 2 is not limited to two disturbances.

Figure 3:
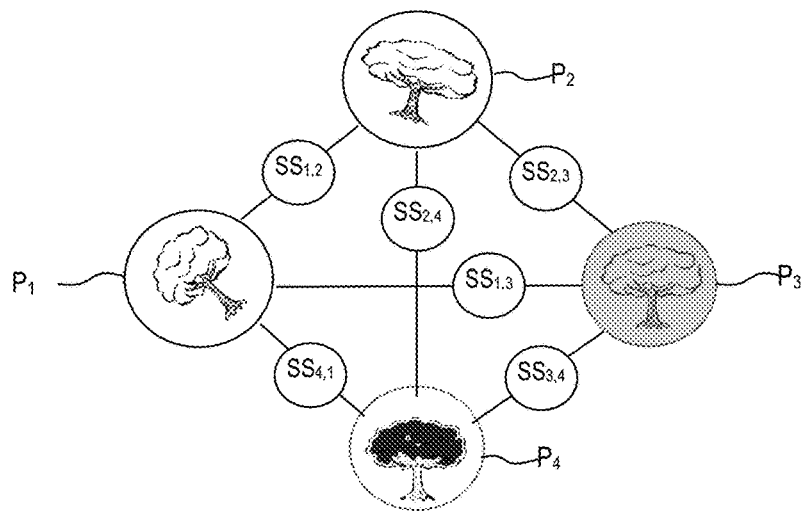
FIG. 3 is a diagrammatic representation of examples of image disturbances that can be applied to an image.

FIG. 3 is a non-limitative diagrammatic representation of four image disturbances that can be taken into account in the method according to the invention.

The disturbance P1 corresponds to an image rotation.

The disturbance P2 corresponds to a shear deformation of an image.

The disturbance P3 corresponds to the addition of noise in an image.

The disturbance P4 corresponds to an alteration of at least one colour in the image.

As shown in FIG. 2, a similarity score is calculated for the similarity between all the disturbances $P_1$-$P_4$ taken in twos.

In addition, it is to be noted that the individual similarity score $SSI_{i,j}$ for the similarity of a disturbance $P_i$ to a disturbance $P_j$ is equal to the individual similarity score $SSI_{j,i}$ for the similarity of the disturbance $P_j$ to the disturbance $P_i$.

Thus, for a group of N disturbances, the method according to the invention determines $[(N*(N-1))/2]$ individual similarity scores, which are then taken into account in the calculation of the overall robustness score.

Of course, the invention is not limited to the examples detailed above.

We claim:

1. A method for evaluating robustness of a neural network used for image processing against a group of at least two different image disturbances, said method comprising:

for each image disturbance of said group of said at least two different image disturbances, determining an individual robustness score of said neural network, representative of a robustness of the neural network against said each image disturbance;

for at least one pair of image disturbances of said group, determining a corresponding individual similarity score, representative of a similarity between the at least two different image disturbances of said at least one pair of image disturbances; and calculating an overall robustness score of said neural network against said group of at least two different image disturbances, as a function of:
each determined individual robustness score, and
the corresponding individual similarity score determined for the at least one pair of image disturbances;
wherein the corresponding individual similarity score for the similarity of a first image disturbance of the at least one pair of image disturbances to a second image disturbance of the at least one pair of image disturbances is equal to the corresponding individual similarity score for the similarity of the second image disturbance to the first image disturbance.

2. The method according to claim 1, further comprising, for each image disturbance in the group, determining the corresponding individual similarity score between said each image disturbance and each other image disturbances in said group, said calculating of the overall robustness score being carried out as a function of all of each of said corresponding individual similarity score.

3. The method according to claim 1, wherein determining the corresponding individual similarity score for the first image disturbance and the second image disturbance, carried out with a set of images, comprises:
constructing a first version of said set of images, in which each image contains said first image disturbance, and a second version of said set of images, in which each image contains said second image disturbance;
obtaining a first instance of the neural network trained with said first version of said set of images and a second instance of said neural network trained with said second version of said set of images;
determining a first relative robustness score, by testing said first instance of the neural network on said second version of said set of images, and a second relative robustness score, by testing said second instance of the neural network with said first version of said set of images; and
calculating the corresponding individual similarity score as a function of said first relative robustness score and said second relative robustness score.

4. The method according to claim 3, wherein the corresponding individual similarity score corresponds to an average of the first relative robustness score and said second relative robustness score.

5. The method according to claim 1, wherein, for said each image disturbance, said determining said individual robustness score comprises:
training the neural network with a set of images, called training set;
constructing a modified version of said set of images, in which each image contains said each image disturbance;
determining said individual robustness score by testing said neural network that has been trained on said modified version of the set of images.

6. The method according to claim 1, wherein said calculating the overall robustness score comprises, for at least one, in particular each, image disturbance, weighting the individual robustness score obtained for said image disturbance with the corresponding individual similarity score for the similarity of said image disturbance to each of other image disturbances.

7. The method according to claim 6, wherein the overall robustness score is calculated as being an average of all of the each determined individual robustness score that has been weighted.

8. The method according to claim 1, wherein at least one image disturbance is chosen from:
distortion of at least one colour in an image;
rotation of an image;
shearing of an image;
blurring of an image;
noise in an image.

9. The method according to claim 1, wherein each of the first image disturbance and the second image disturbance is a modification of an image.

10. The method according to claim 9, wherein the first image disturbance and the second image disturbance are different image modifications, and
wherein the individual similarity score of the first image disturbance and the second image disturbance is a score representative of the similarity between the way each of the first image disturbance and the second image disturbance modifies an image.

11. The method according to claim 1, wherein the overall robustness score is an average of individual robustness scores that are weighted.

12. A device for evaluating robustness of a neural network used for image processing against a group of at least two different image disturbances that can be found in images, said device configured to:
determine an individual robustness score, of said neural network for each image disturbance in said group;
determine at least one individual similarity score for a similarity between two image disturbances in said group; and
calculate an overall robustness score, of said neural network against said group of at least two different image disturbances;
determine said individual robustness score, of said neural network for said each image disturbance in said group;
determine said at least one individual similarity score for the similarity between said two image disturbances in said group; and
calculate said overall robustness score, of said neural network against said group of at least two different image disturbances as a function of:
the individual robustness score for said each image disturbance of said group of at least two different image disturbances, and
said at least one individual similarity score for the similarity between said two image disturbances;
wherein an individual similarity score of said at least one individual similarity score for the similarity of a first image disturbance of the two image disturbances to a second image disturbance of the two image disturbances is equal to the individual similarity score for the similarity of the second image disturbance to the first image disturbance.

13. The device according to claim 12, wherein each of the first image disturbance and the second image disturbance is a modification of an image.

14. The device according to claim 13, wherein the first image disturbance and the second image disturbance are different image modifications, and
wherein the individual similarity score of the first image disturbance and the second image disturbance is a score representative of the similarity between the way each of the first image disturbance and the second image disturbance modifies an image.

15. The device according to claim 12, wherein said calculate said overall robustness score comprises, for at least one, in particular each, image disturbance, weighting the individual robustness score obtained for said image disturbance with the individual similarity score for the similarity of said image disturbance to each of other image disturbances.

16. The device according to claim 15, wherein the overall robustness score is calculated as being an average of the individual robustness score for said each image disturbance that has been weighted.

17. The device according to claim 12, wherein the overall robustness score is an average of individual robustness scores that are weighted.

* * * * *